(12) United States Patent
Mitchell et al.

(10) Patent No.: US 12,381,738 B2
(45) Date of Patent: Aug. 5, 2025

(54) ZERO-TRUST MULTI-HOP AUTHENTICATION AND AUTHORIZATION

(71) Applicant: HashiCorp, Inc., San Francisco, CA (US)

(72) Inventors: Jeff Mitchell, San Francisco, CA (US); James Lambert, San Francisco, CA (US)

(73) Assignee: HashiCorp, San Francisco, CA (US)

( * ) Notice: Subject to any disclaimer, the term of this patent is extended or adjusted under 35 U.S.C. 154(b) by 299 days.

(21) Appl. No.: 18/137,363

(22) Filed: Apr. 20, 2023

(65) Prior Publication Data

US 2024/0356757 A1   Oct. 24, 2024

(51) Int. Cl.
   *H04L 9/32* (2006.01)

(52) U.S. Cl.
   CPC .......... *H04L 9/3247* (2013.01); *H04L 9/3226* (2013.01); *H04L 9/3268* (2013.01)

(58) Field of Classification Search
   CPC . H04L 63/0823; H04L 9/3263; H04L 9/3268; H04L 9/3265; H04L 9/321; H04L 9/3247; H04L 9/3226
   See application file for complete search history.

(56) References Cited

U.S. PATENT DOCUMENTS

| | | | |
|---|---|---|---|
| 10,263,976 B2 * | 4/2019 | Loehr | H04W 12/082 |
| 10,903,991 B1 * | 1/2021 | Craige | H04L 9/085 |
| 11,030,331 B2 * | 6/2021 | Schvey | H04L 63/04 |
| 2008/0134311 A1 * | 6/2008 | Medvinsky | H04L 9/3263 726/12 |
| 2009/0327696 A1 * | 12/2009 | Hatlelid | H04L 9/321 713/151 |
| 2010/0161817 A1 * | 6/2010 | Xiao | H04L 67/1046 709/229 |
| 2014/0164764 A1 * | 6/2014 | Pushkin | H04L 63/0823 713/176 |
| 2016/0277446 A1 * | 9/2016 | Kumar | H04L 45/74 |
| 2017/0014094 A1 * | 1/2017 | Hiroshige | A61B 6/4233 |
| 2019/0074982 A1 * | 3/2019 | Hughes | H04L 9/0863 |
| 2023/0224167 A1 * | 7/2023 | Wang | H04L 63/10 713/158 |

(Continued)

FOREIGN PATENT DOCUMENTS

CN   114640495   *   6/2022   ......... H04L 63/0236

*Primary Examiner* — Matthew Smithers
(74) *Attorney, Agent, or Firm* — FisherBroyles LLP; James P. Cleary

(57) ABSTRACT

A process and mechanism, such as a system and/or computer-implemented method, for establishing verified and trusted communications between an upstream and a downstream node in a network or across many nodes in a multi-hop fashion, without needing direct communications from the downstream node to a central authority. Only a single node needs direct communications with the central authority, which may be the central authority itself acting in this capacity. Any other node in the network can connect to a node that is already verified, establish mutual trust, and itself become "upstream" to a new node or set of nodes. This process and mechanism can apply to any two nodes that are configured to communicate given the same set of conditions without any explicit or implicit multi-hop capability, however, the present process and mechanism is most applicable in multi-hop systems.

21 Claims, 7 Drawing Sheets

(56) References Cited

U.S. PATENT DOCUMENTS

| | | | |
|---|---|---|---|
| 2023/0246816 A1* | 8/2023 | Heilman | H04L 9/0825 713/171 |
| 2024/0314227 A1* | 9/2024 | Trere | H04L 67/10 |

* cited by examiner

ZERO-TRUST MULTI-HOP AUTHENTICATION AND AUTHORIZATION

TECHNICAL FIELD

The subject matter described herein relates to a mechanism for zero-trust, multi-hop authentication and authorization of computing nodes in a network.

BACKGROUND

As generally illustrated in FIG. 1, traditional access to private networks is via Virtual Private Networks (VPNs) 100 that logically bridge together a network between a client machine 102 and a private network or network segment of one or more servers 104. Once a client machine is successfully connected, or "VPN'd," into a private network 106, which often entails an authentication and authorization step, there is often an assumption of authorization and/or validity of the client. However, VPNs may or may not have capabilities to act as a proxy for individual network streams, API calls, etc., as a part of the product offering, as opposed to simply enabling the client to directly join the private network which might impact security of the VPN.

There are some security products in the Software-Defined Perimeter (SDP) and Privileged Access Management (PAM) spaces that work by controlling access to endpoints (machines, software services, APIs, etc.) on a per-connection basis, acting as a proxy at various levels of the Open Systems Interconnection (OSI) network model-most often at levels 3, 4, and 7, and individually authenticating and/or authorizing the connections. These endpoints are usually on different logical networks than the user trying to connect to them, e.g., the public Internet versus a corporate private intranet, but are not required to be. While many products are built as either an SDP or a VPN, there are also some products that straddle a line between traditional VPNs and per-connection access.

Many of the SDP and PAM products provide the capability to gate or limit access to endpoints, not just within one private network but across a network or within nested private networks. As one example, within a company's private datacenter network a Payment Card Industry (PCI) enclave may exist containing machines with extremely specific security requirements and restrictions on allowed inbound network access, where traffic may need to pass from the public Internet first to the private datacenter network and then to an authorized inbound location in the PCI enclave. There may also be multiple logical parts of a single network that are serviced by different internal aspects of a security product. For instance, a particular service on the same network may wish to only allow inbound network access via a particular instantiation of the product.

The capability to traverse these is often enabled by a multi-hop capability of the security product, where network traffic, API calls, etc., pass through multiple instantiations of the security product or aspects of the security product, referred to as nodes.

Multi-hop capabilities across one or more nodes are not limited to such security products. More generally, a multi-hop system can be described as a set of nodes that have established communications allowing them to act as a coherent whole to perform some function. In the case of some products, such as Boundary by HashiCorp, this function is to relay or proxy data-plane network traffic (in the form of IP packets, TCP streams, API or RPC calls, etc.) on behalf of source clients to and from their desired destinations. However, multi-hop systems need not be limited to proxying network traffic. Additionally, multi-hop behavior is not necessarily the sole and exclusive functionality of such a system. For instance, in Boundary, in order to proxy data-plane traffic from any particular source to a given destination, there may be no need to have this traffic flow through multiple hops.

In a naive implementation of a node within a multi-hop system, any new node that wishes to establish communications with other nodes may be assumed to be valid, that is, authenticated and authorized. Alternatively, there may be no authentication or authorization capabilities. This is simple to implement but not suitable for most applications. In most cases, both nodes establishing this new line of communications must decide to trust the other. Two nodes wishing to establish a line of communication can be referred to herein as "upstream" and "downstream" nodes, where the upstream node is already established (that is, validated and verified) within the multi-hop system.

In most implementations of secure networking, including VPNs and multi-hop systems, a central authority is responsible for providing a root of trust. The central authority usually provides a cryptographic signing service that validates private keys held by nodes; in this manner it is often, but not exclusively, a certificate authority that issues X.509v3 certificates. The root of trust provided by the central authority guarantees, among other things, that if nodes can validate and verify (usually via cryptographic means) that some credential presented by another node was both issued by the central authority and not subsequently revoked, then the two nodes may decide to trust each other and establish communications. The central authority may or may not itself be a node, or act in the manner of a node within the multi-hop system.

However, there is a tension with respect to the central authority's credentials: if those credentials are long-lived then they are increasingly vulnerable to replay attacks, where the valid credential is obtained and re-used by a third party to trick a node into believing the third party is an authorized part of the multi-hop system, thus allowing it to join the system. As such, there is typically a revocation method employed, where the central authority later asserts that a previously issued credential is no longer valid, or the credentials are time limited such that they must be constantly refreshed from the central authority by the node.

To ensure secure communications, existing multi-hop systems require both the downstream and upstream nodes to have direct communication to the central authority in order to receive credentials to be used for the establishment of direct communications between the upstream and downstream nodes and/or to check for revocation of credentials, which has some drawbacks.

As discussed herein, conventional implementations of multi-hop systems usually use longer-lived credentials and revocation checking, or very short-lived credentials in their workflows. However, one step that is common across these workflows is that each individual node needs to be known somehow to the central authority, such as by a registration step. There may be various expected outcomes of such registration steps, as described further herein. Authorizing a previously completely unknown node to such a system can be a problem with significant security implications. For instance, such a mechanism could be achieved by allowing any holder of a shared credential to join the system. However, the security flaws inherent in such a system should disqualify it from many, or even most, applications. Secure, long-term storage of a node's credentials can be an additional security concern.

Node Connection without Revocation Checking

FIG. 2 illustrates a current state of the art, based on a simplified version of the Transport Layer Security (TLS) 1.3 protocol as codified in RFC 8446. This is not a required version of TLS, nor is TLS a requisite for the present invention, but provides a useful baseline for describing the invention. For example, some messages described herein (such as "ClientHello," "ServerHello," etc.) are from the TLS 1.3 RFC but should be understood to represent an abstract handshake of two nodes via asymmetric keys in order to establish a secure and trusted connection. Additionally, the terms "server certificate" and "client certificate" should be understood as terms of art within this baseline of TLS 1.3, where they represent X.509v3 certificates marked for server or client use, respectively, via the ExtendedKeyUsage feature, for example.

In an example of a simplified TLS 1.3 handshake as illustrated in FIG. 2, a client (downstream node) and a server 204 (upstream node) wish to communicate using a key establishment/exchange capability, such as Diffie-Hellman for example, in this case with private keys and public keys codified on certificates signed by a central authority. For simplicity, this example does not illustrate revocation checking. Reference numbers associated with communications refer to the steps in the node connection process. (1, 2) Both the server and the client are given by a central authority 206 (or an operator acting on its behalf), in advance, an appropriately typed certificate and the central authority's root certificate, which can be used to validate the signature on the client and server certificates. (3) The client initiates a connection to the server. (4, 5, 6) The server responds with a confirmation and metadata about the connection parameters, a request for the client to provide its certificate, and its own certificate, along with a verification signature to allow the client to validate that the server has access to the private key corresponding to the public key in the server's certificate. (7) The client validates the certificate using normal means, such as via the standard path validation mechanism described in RFC 5280, along with any signature on the received data. (8) The client responds with its certificate, along with a verification signature to allow the server to validate that the client has access to the private key corresponding to the public key in the client's certificate. (9) The server validates the certificate using normal means, along with any signature on the received data.

Node Connection with Revocation Checking

FIG. 3 illustrates a handshake process in which revocation checking is used, which is considered standard industry practice. (1, 2) Both are given, in advance, an appropriately typed certificate and the central authority's root certificate, which can be used to validate the signature on the client and server certificates. (3) The client 202 initiates a connection to the server 204. (4, 5, 6) The server responds with a confirmation and metadata about the connection parameters, a request for the client to provide its certificate, and its own certificate, along with a verification signature to allow the client to validate that the server has access to the private key corresponding to the public key in the server's certificate. (7) The client 202 validates the certificate using normal means, possibly via the standard path validation mechanism described in RFC 5280, along with any signature on the received data. (7.1, 7.2, 7.3) The client 202 performs some action to check whether the server's certificate has been revoked. Some examples are listed here but are not exhaustive. Notably, either the client 202 must reach out to the central authority 206 or must check some other authorized distributed information store, such as a local cache, a federated service, or a distributed database such as a blockchain, which in turn must be kept properly up to date. (8) The client 202 responds with its certificate, along with a verification signature to allow the server to validate that the client has access to the private key corresponding to the public key in the client's 202 certificate. (9) The server 204 validates the certificate using normal means, along with any signature on the received data. (9.1, 9.2, 9.3) The server performs some action to check whether the client's 202 certificate has been revoked. Importantly, either the server 204 must reach out to the central authority or check cached information, a federated service, or a distributed database such as a blockchain, which in turn must be kept properly up to date. One such possibility, delegate revocation checking to a separate revocation authority, is shown in FIG. 4. This is often performed to lessen the burden on any central authority 206 or distribution mechanism.

Long-Lived Credentials

Long-lived credentials are valid for extended periods of time, often a month to a year. Because of their extended validity, there is higher concern of theft or accidental disclosure of valid credentials, and as such there is usually a revocation mechanism.

A common mechanism for this type of credential uses X.509 version 3 certificates as described in RFC 5280. These certificates have encoded lifetimes, but in the absence of revocation are assumed to be valid for their full span. The certificates are cryptographically associated with a private key known only to the downstream node; a signature of the associated public key is encoded in the certificate and was signed by the central authority's (known in this scheme as a Certificate Authority (CA)) private key. Registration of a node will usually entail generating this signed certificate.

In order to know whether a credential is still valid for its entire encoded lifetime, several mechanisms are currently known and used to check for revocation of such a certificate. A Certificate Revocation List (CRL) is a cryptographically signed list of serial numbers of certificates originally signed by the central authority 206 that serves as an updateable list of certificates that are no longer valid. However, this mechanism has several limitations that are mostly of distribution: any upstream node that may be choosing whether to trust a downstream node's credentials must have a constantly updated list.

Getting such an updated list to nodes can be challenging. In the current state of the art there are two common mechanisms: a "push" mechanism where updated CRLs must be sent to each node; and a "pull" mechanism where each node must continually fetch new CRLs. There are various terms for these concepts in the state of the art; "push" and "pull" describe the abstract mechanisms. For example, CRLSets is a technology that operates in a "push" mode; Certificate Transparency is a technology that does not use CRLs for revocation tracking but operates on a mechanism similar to a "pull" mode. Each of these mechanisms has complications, as described further below.

Crl "Push Mode"

In this mode, security of the system relies on an ability to successfully push updated CRLs to each node, which may not be possible. For instance, in the previously discussed scenarios where there may be extremely limited access to some nodes or networks, there may not actually be any way to access each individual node at any given time.

There is also no way for a node to know whether its CRL is fully updated. It must simply trust that the last CRL that it has is correct, and that if there was a newer CRL, it would be in possession of it. CRLs are timestamped, so it could assume that if it has been over some time threshold from the timestamp of the last CRL that it is missing the latest one, but that does not indicate whether or not the entries on the new one are the same as the old (e.g., whether more certificates have since been revoked).

Crl "Pull Mode"

In pull mode, a node must know what to do if it is unable to successfully fetch the latest CRL. In many cases the last known answer is used for some period of time while issuing errors to operators (a soft-fail mode), after which all authentication attempts are simply revoked; however, this period of time is often 72 hours which is ample time for a bad actor to abuse this kind of failure.

Worse, a new downstream node may have no way to actually fetch a CRL except through its upstream node, if it can successfully connect to the system in the first place. The upstream node may allow it to fetch the CRL before authenticating into the overall multi-hop system, but this provides the ability for the upstream node to be a bad actor. In one example, it could substitute an old CRL that does not contain key recent revocations, opening up attack vectors against the downstream node. In other words, this requires the downstream node to trust the upstream node before it has verified it.

Online Certificate Status Protocol (Ocsp)

OCSP is another model which is designed to allow for a series of servers to answer in real-time whether a certificate can be trusted, with trust delegated to these servers by the central authority. This suffers from similar soft-fail issues as with pull-mode CRL systems, while introducing significantly more complications.

Certificate Transparency

Another model is Certificate Transparency, in which issued certificates and their revocation are codified on a public ledger (blockchain) that is traversable by any system. Due to the required infrastructure to support this, it is designed for use in the public Internet and assumes connectivity that, like with CRL Pull Mode, may not exist. The ledger could be distributed to other nodes to avoid the pull-mode issues, but this then simply trades those issues for CRL Push Mode issues. Overall, long-lived credentials require revocation, but there are serious revocation challenges due to the nature of such multi-hop networks and the potential inability of a downstream node to directly access other resources (e.g., the central authority or OCSP servers).

Short-Lived Credentials

The idea behind short-lived credentials is often that if the credentials are short-lived enough, revocation checking is unneeded. These usually take the form of JSON Web Tokens, cryptographically verifiable tokens signed by a central authority. Often the embedded lifetime of these credentials is around 15 minutes. These short-lived credentials may be delivered periodically by a third-party service (which introduces extra failure modes and security considerations) or may be obtained by the nodes from the central authority as needed using the credentials granted to them at registration time, which requires direct connectivity from each node to the central authority.

Unfortunately, short-lived credentials suffer from the same issues as long-lived credentials. Many modern applications consider even this period to be too long without verifying validity of the token, and so make a callback to a service or API endpoint to verify that the credential is still valid, usually by using the credential itself as the authentication/authorization mechanism for this call. As a result, the same connectivity concerns that affect the CRL pull method as described above affect short-lived credentials.

The main benefit of this model is that all such revocation checks are real-time. They require each node to have central authority connectivity (or to one of its delegated services, similar to the OCSP challenges described above) but they avoid the soft-fail problem that can happen with CRLs when they are unable to be fetched. An inability to query the revocation callback simply results in a refusal to accept the credential.

SUMMARY

This document discloses a process and mechanism for establishing verified and trusted communications between an upstream and a downstream node, including revocation checking, without needing direct communications from the downstream node to a central authority. As such, only a single node needs direct communications to the central authority (which may be the central authority itself acting as a node); any other node in the network can connect to a node that is already verified, establish mutual trust, and itself become a verified upstream for a new node or set of nodes.

The mechanism allows a new downstream node to join a multi-hop system by way of an upstream node without requiring the downstream node to make a direct connection to the central authority, providing a significant advantage over conventional mechanisms for establishing a private network. This mechanism allows for just-in-time credential revocation checking, in which credentials that were issued in the past are never blindly trusted, and instead all aspects of the system are validated at each and every connection time. In this manner it is similar to revocation checking described earlier for short-lived credentials, but without the same drawbacks. This just-in-time revocation checking also provides a valuable "zero trust" security property to the system.

In some aspects, a system, method and computer program product are described for establishing verified and trusted communications between an upstream node and a downstream node in a network. Steps or operations of such a system, method and computer program product include granting, by a central authority, a credential to each of the upstream node and the downstream node, the credential being configured to allow the upstream node and the downstream node to cryptographically sign messages, and passing, by the downstream node to the upstream node, a cryptographically signed message containing a nonce, the nonce comprising a one-time use random value. The steps or operations further include contacting, by the upstream node, the central authority using the nonce, and validating, by the central authority, the nonce from the downstream node using a validation mechanism configured for validating the signature on the nonce based on the credential and signature type. The steps or operations further include issuing, by the central authority, a new cryptographically signed message for the upstream node to present to the downstream node, the new cryptographically signed message containing the nonce associated with the downstream node, and verifying, by the upstream node and the downstream node, that the credentials of both nodes are valid according to the central authority.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an authentication and authorization process and mechanism for a network, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
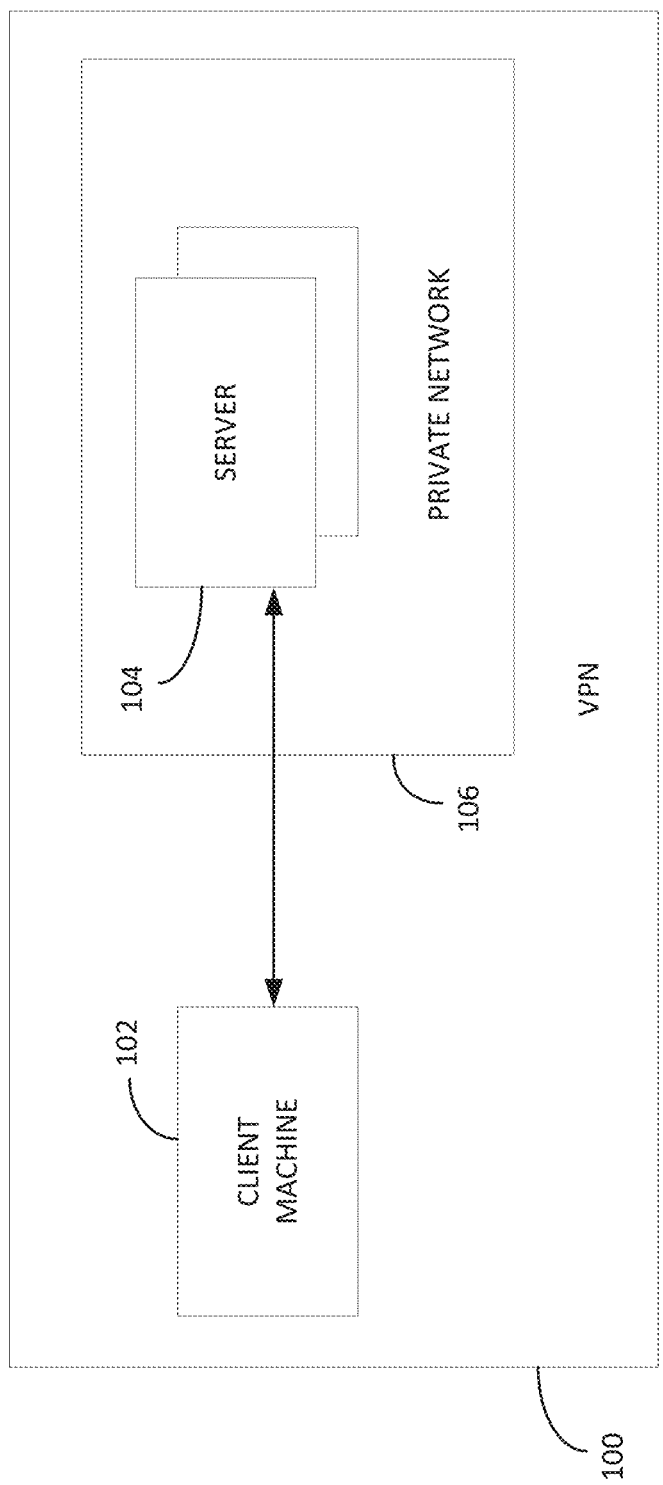
FIG. 1 is a system block diagram of a virtual private network.
Figure 2:
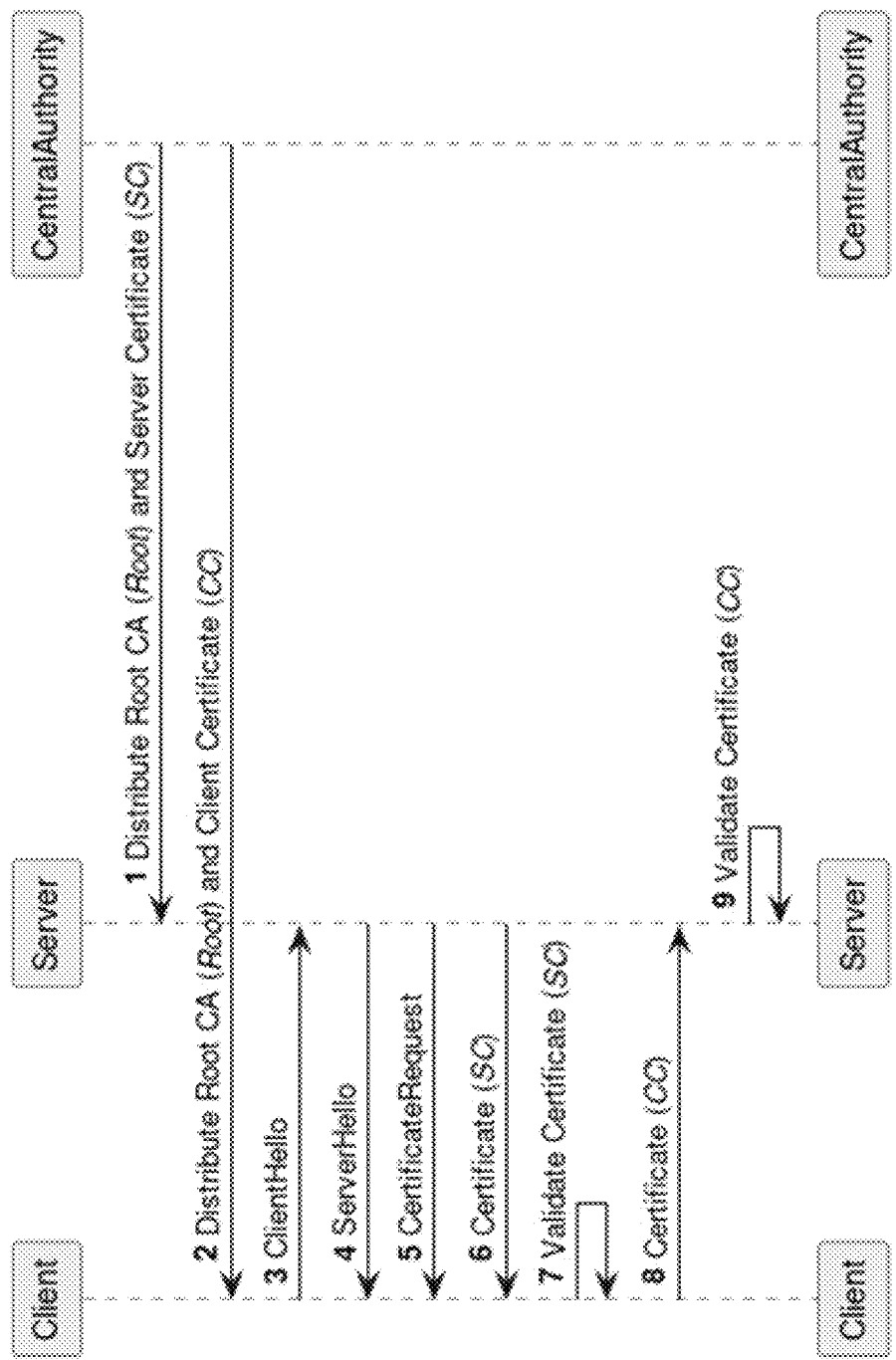
FIGS. 2-4 illustrate prior art techniques for validating nodes in a virtual private network.
Figure 3:
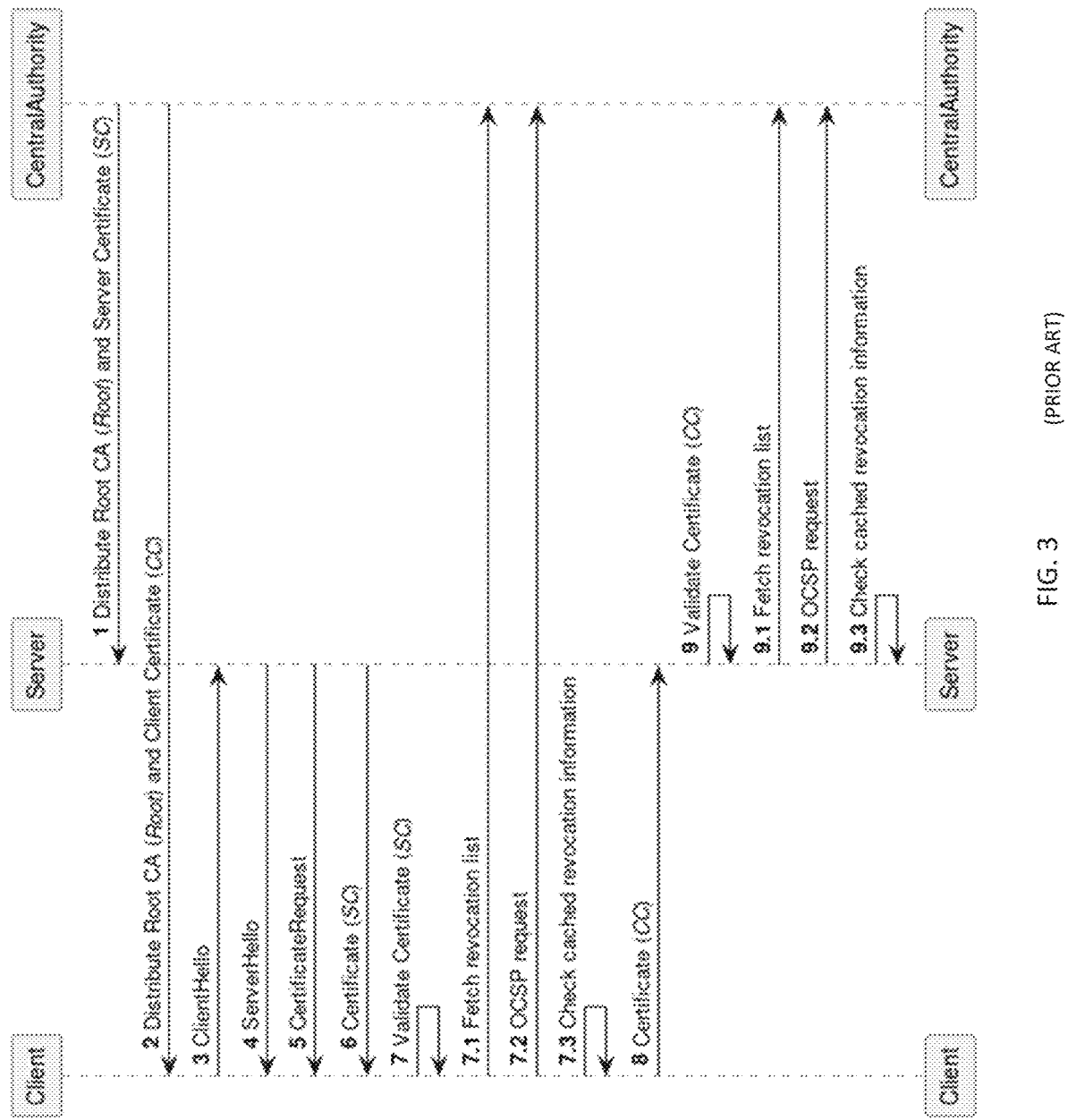
Figure 4:
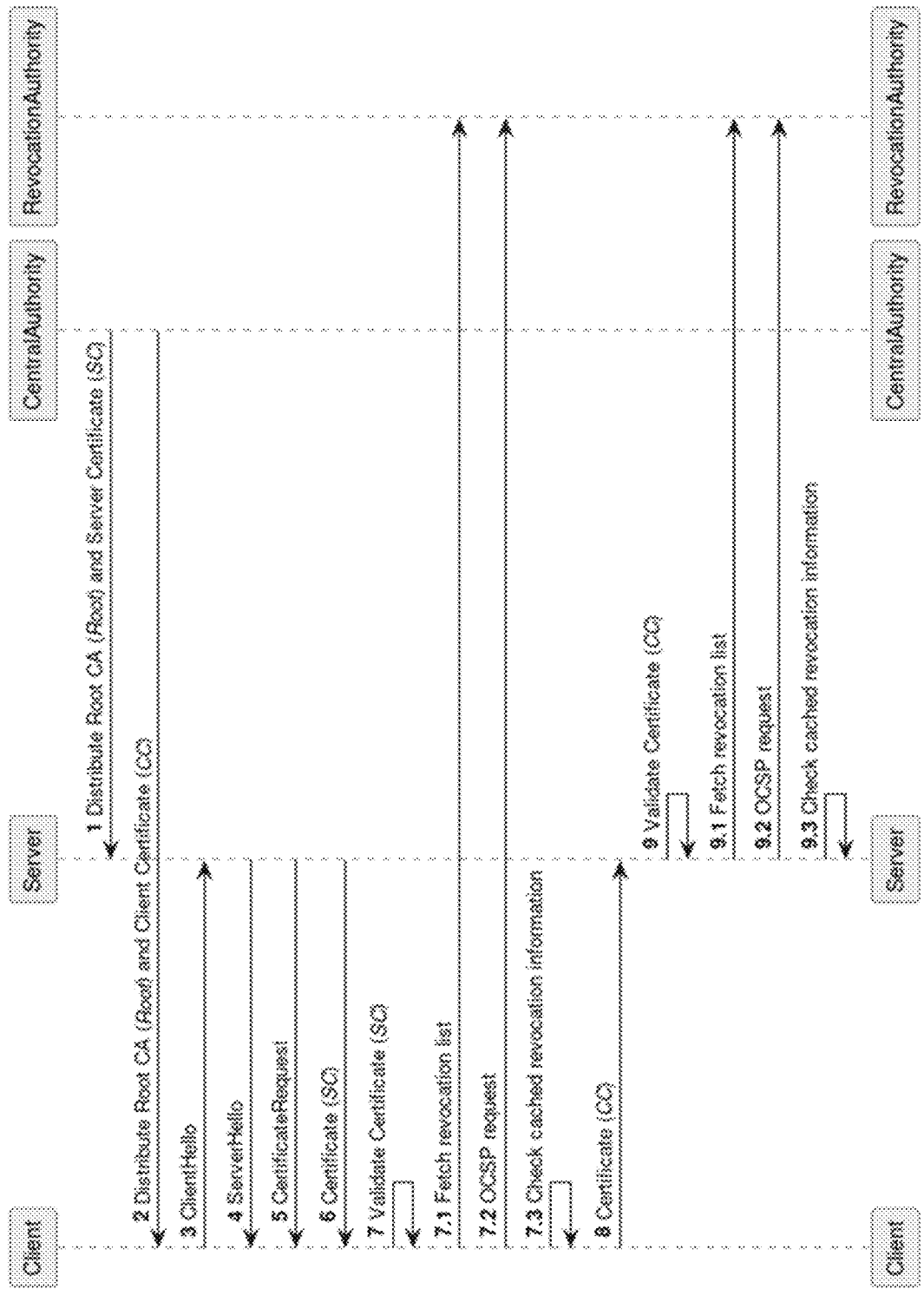

This document describes a process and mechanism, such as a system and/or computer-implemented method, for establishing verified and trusted communications between an upstream and a downstream node in a network or across many nodes in a multi-hop fashion, without needing direct communications from the downstream node to the central authority. As such, only a single node needs direct communications to the central authority, which may be the central authority itself acting in this capacity; any other node in the network can connect to a node that is already verified, establish mutual trust, and itself become "upstream" to a new node or set of nodes. This process and mechanism can apply to any two nodes that are configured to communicate given the same set of conditions without any explicit or implicit multi-hop capability, however, the present process and mechanism is most applicable in multi-hop systems.

In some implementations, a system and method are configured to allow an upstream and downstream node to validate credentials and verify each other in a way that both allows for revocation checking and that does not require the downstream node to have existing connectivity to the central authority. As described further herein, post registration, any downstream node can connect to an upstream node and have both nodes verify each other, with only the upstream node requiring connectivity to the central authority (potentially via multiple hops using its own upstream node or nodes).

In preferred implementations of the subject matter described herein, each node (such as a client computer) is registered to a central authority, whereby each node is granted a client credential that can be used to cryptographically sign messages. This credential is a signed certificate endorsing a public key known to the central authority, with the associated private key being generated by the node or provided to the node by the central authority. The downstream node connects to the upstream node, passing a cryptographically signed message at connection time including a one-time use random value (a nonce). The upstream node contacts the central authority (either directly, or via some number of hops in the existing multi-hop network). The central authority validates the provenance of the signed nonce using its copy of the downstream node's public key. If validated, the central authority issues a new cryptographically signed server-side credential for the upstream node to present to the downstream node, containing the downstream node's original nonce embedded within. The upstream node presents this credential to the downstream node, which presents its own connection credentials to the upstream node, containing the central authority's signature on the public key that was just checked for revocation. The upstream and downstream nodes verify that the credentials are valid and signed by the central authority.

At this point the mechanism has the following properties: The system has validated that no credentials are revoked: when the central authority validates the client's cryptographically signed message, it is also asserting that the client (and its key) are still valid; it will not respond successfully with a credential to the upstream node if not. The upstream node's credentials do not need to be validated by the central authority at this time because the upstream node's credentials were validated it when it joined the network via its client credentials; at any time the system can remove it from the network by asking downstream nodes to disconnect that revoked node, at which point attempts to reconnect will fail due to an inability for upstream nodes to validate the now-revoked client key. The upstream node has validated the downstream node: it ensures that the presented credentials are cryptographically valid and were signed by the central authority. The downstream node has validated the upstream node: it ensures that the presented credentials are cryptographically valid and signed by the central authority; additionally, by ensuring that the nonce it generated is included in the upstream node's credentials, it knows that this credential has been issued just now by the central authority, meaning that the central authority must still consider the upstream node to be valid.

In summary, the mechanism allows a new downstream node to join the multi-hop system by way of an upstream node without requiring the downstream node to make a direct connection to the central authority, providing a significant advantage over other mechanisms. Ensuring just-in-time credential revocation checking also provides a "zero-trust" property: at no point are we blindly trusting credentials that were issued in the past, and instead all aspects of the system are validated at the establishment of each and every connection. This mechanism enables use-cases that are not possible to satisfy with existing approaches.

It was previously mentioned that one benefit of this mechanism is the ability to require only one node to have direct reachability to the central authority. This can allow for a multi-hop system to be constructed when it might otherwise not be possible. In some implementations, for example a PCI enclave, there may be limited reachability; general network access may only be allowed from inside the enclave to outside, and only to certain endpoints, such as network endpoints directly outside of the enclave boundaries. By installing a node from this system inside the PCI enclave it can use the multi-hop capability to proxy traffic from outside the PCI enclave into it, providing reachability where there may otherwise be none. If it was required that all nodes must have reachability to the central authority, it may not be possible to use such a system for this purpose, as the node inside the PCI enclave may not have access to the central authority if it is not immediately outside of its network boundaries or on an approved list of endpoints that can be directly connected to.

In another example, a managed service provider may wish to have access to its managed services inside a client's network. Adding a multi-hop node into the client network to proxy traffic may allow the managed service provider to gain access to its services. However, if the central authority is provided by a third party (such as an external Identity Provider (IdP) or if the multi-hop network itself is managed by a different managed service provider), there may be contractual or indemnification concerns: the client may have a contract with and trust its managed service provider, but those contractual agreements are not necessarily transitive to the central authority, and making direct calls from the client network to the central authority could raise legal or liability issues.

The invention enhances these standard mechanisms by allowing for mutual validation of the upstream (server) and downstream (client) nodes without needing to use traditional revocation checks and their drawbacks. The following benefits are realized:

Revocation information need not be constantly fetched, updated, or cached, instead all revocation checks are just-in-time, eliminating the possibility of a credential being used after revocation but before any node in the system is updated. Part of the validated credentials are created just-in-time, ensuring unique credentials for every connection, further enhancing security. Only the upstream node needs to communicate with the central authority in order for mutual validation to succeed; the central authority can also itself act as an upstream node.

As mentioned earlier, this last point means that networks of nodes can be built where each node can connect to and validate a node that already exists in the network without needing access to any other service, such as the central authority, via the upstream node making calls to the central authority through other nodes in the system. This is a clear differentiator from current state-of-the-art systems.

Figure 5:
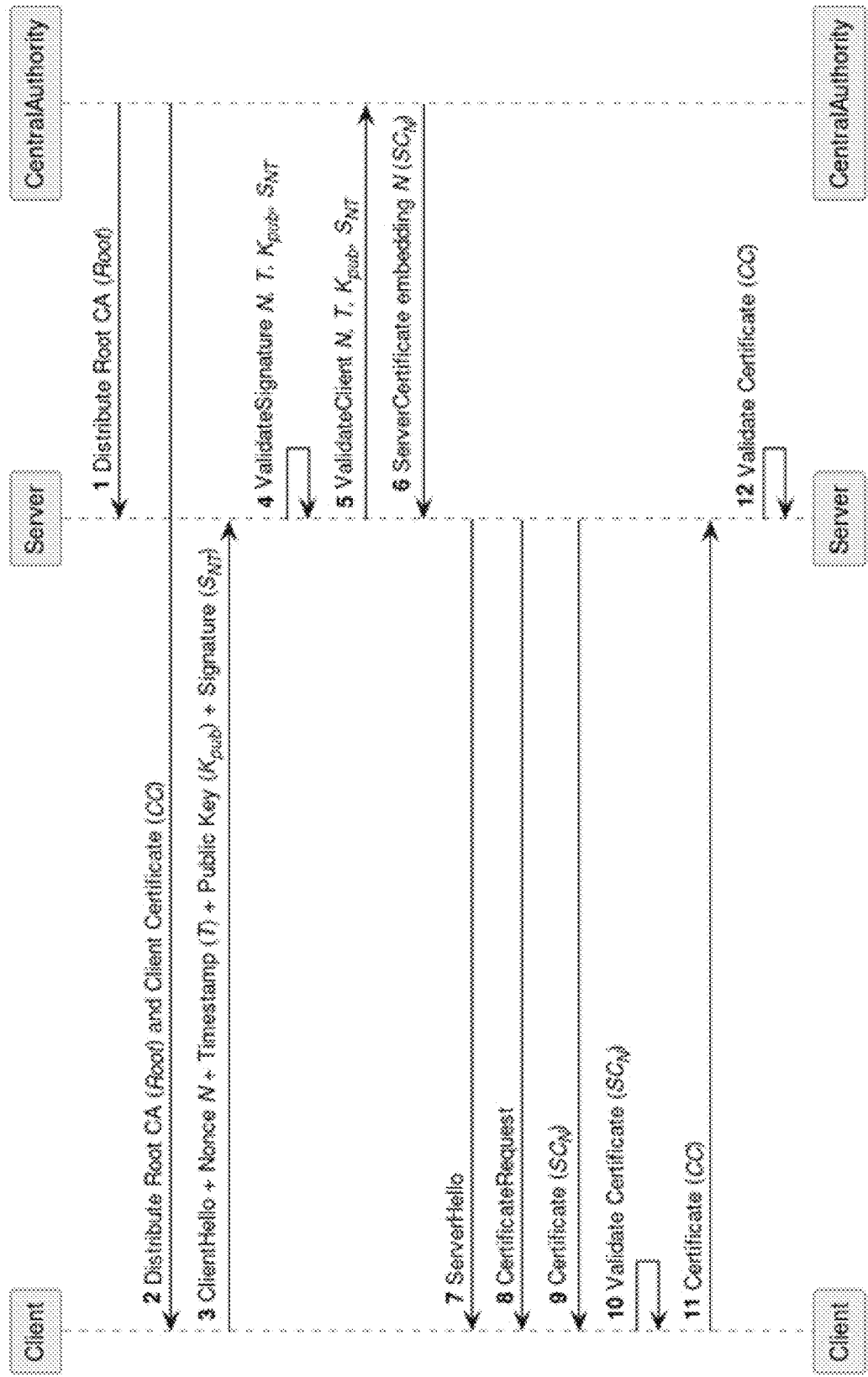
FIG. 5-7 illustrate variations of a process and mechanism for establishing verified and trusted communications between an upstream node and a downstream node, without needing direct communications from the downstream node to a central authority.

FIG. 5 illustrates this process, also based on a simplified TLS exchange. (1, 2) Both nodes are given, in advance, the central authority's root certificate, which can be used to validate the signature on the client and server certificates; the client is also given a client certificate, but no server certificate is supplied. (3) The client initiates a connection to the server. This initial message is extended with the addition of a randomly generated nonce, a timestamp, the client's public key, and a signature over this data using the client's private key. Other data may also be added but are not critical to the mechanism. Additionally, while this implementation uses these pieces of data, other implementations are possible that trade off different security or other pros/cons in exchange for different pieces of data. The signature uses the client certificate's associated private key, however, alternate keys specific to the purpose can be used.

With reference still to FIG. 5, (4) the server uses the given public key to validate the signature on the extra information. It also ensures that the timestamp falls within some allowed/acceptable period (as one implementation, this period could be defined within this extra data as two timestamps: not-before and not-after). Although this step is not strictly necessary (it could have the central authority do these checks in the next step), it prevents sending invalid requests to the central authority, reducing the possibility of overloading it. As another implementation, there need not be any timestamp at all; this does not reduce the security of the system, but makes it more likely that a replayed message will be transmitted to the central authority to process and reject instead of being rejected at the server, at a cost of increased load on the central authority.

(5) The server sends the information to the central authority, asking for validation. The central authority matches the public key to ensure it is known and not revoked. The exact implementation of this revocation checking can differ, but typically is a direct check against a data store; in one implementation this could be a certificate database, if the central authority is acting as a certificate authority in the system. The important aspect is that the revocation checking should be definitive, without falling back to the mechanisms described in the current state of the art that can introduce caching, out-of-date, or other issues. The central authority also re-validates the signature on the nonce and timestamp.

(6) The central authority provides a signed server certificate to the server that embeds the nonce initially generated by and transmitted from the client. (7, 8, 9) The server responds to the client with a confirmation and metadata about the connection parameters, a request for the client to provide its certificate, and its own certificate (just provided by the central authority), along with a verification signature to allow the client to validate that the server has access to the private key corresponding to the public key in the server's certificate. (10) The client validates the certificate using normal means, possibly via the standard path validation mechanism described in RFC 5280, along with any signature on the received data. Importantly, there is an extra step as a part of this mechanism: the client validates that the certificate not only comes from the same certificate authority that issued its client certificate, but also contains its randomly generated nonce. This allows the client to trust the node it is communicating with, because the server node has proven that it is in communication with and trusted by the central authority, which would not have provided this certificate otherwise. (11) The client responds with its certificate, along with a verification signature to allow the server to validate that the client has access to the private key corresponding to the public key in the client's certificate. (12) The server validates the certificate using normal means, along with any signature on the received data.

Importantly, there is another extra step as part of this mechanism: the server validates that the certificate not only comes from the same certificate authority that issued its client certificate (in this example, the central authority), but also that the public key described by the certificate is the same public key that signed the original client-provided nonce and timestamp. This allows the server to trust that the node it is communicating with, because the client has proven that it has the private key corresponding to the public key that the central authority vouched for via generating the requested server certificate.

In some implementations, related to step (3), this mechanism can use the TLS NextProtos field (also known as Application Layer Protocol Negotiation, or ALPN) to transmit the extra data, such as nonce/timestamp/signature, possibly via chunking and reconstructing the data over multiple entries. Because this mechanism can be performed in the context of TLS session establishment, it has the beneficial security property that multiple connections are not required to exchange or acquire credentials, which would otherwise require securely correlating the state of those connections.

The uniqueness of the nonce need not be relied on to protect against replay attacks. This is an advantage because it means that storage is not required for storing nonces within the central authority to ensure they are not reused. In the TLS example, this is possible because although the nonce is transmitted in cleartext, the server expects to see that the client certificate presented is issued against the validated public key that signed the nonce. An attacker trying to re-use the ClientHello request containing the nonce would not be able to then complete negotiation due to not having the corresponding private key; if it had the private key it would not need to re-use the ClientHello request in the first place. Although nonce reuse is generally frowned upon, and the central authority could maintain a database of nonces to ensure they are not reused, it is in the interest of the client to ensure it is always random as the client would have no legitimate reason to reuse it. However, in some cases this may be an acceptable tradeoff; for instance if the node software is running on low-powered hardware where it is complicated or difficult to generate good random numbers due to a lack of suitable entropy.

Initial Hop and Multi-Hop

Figure 6:
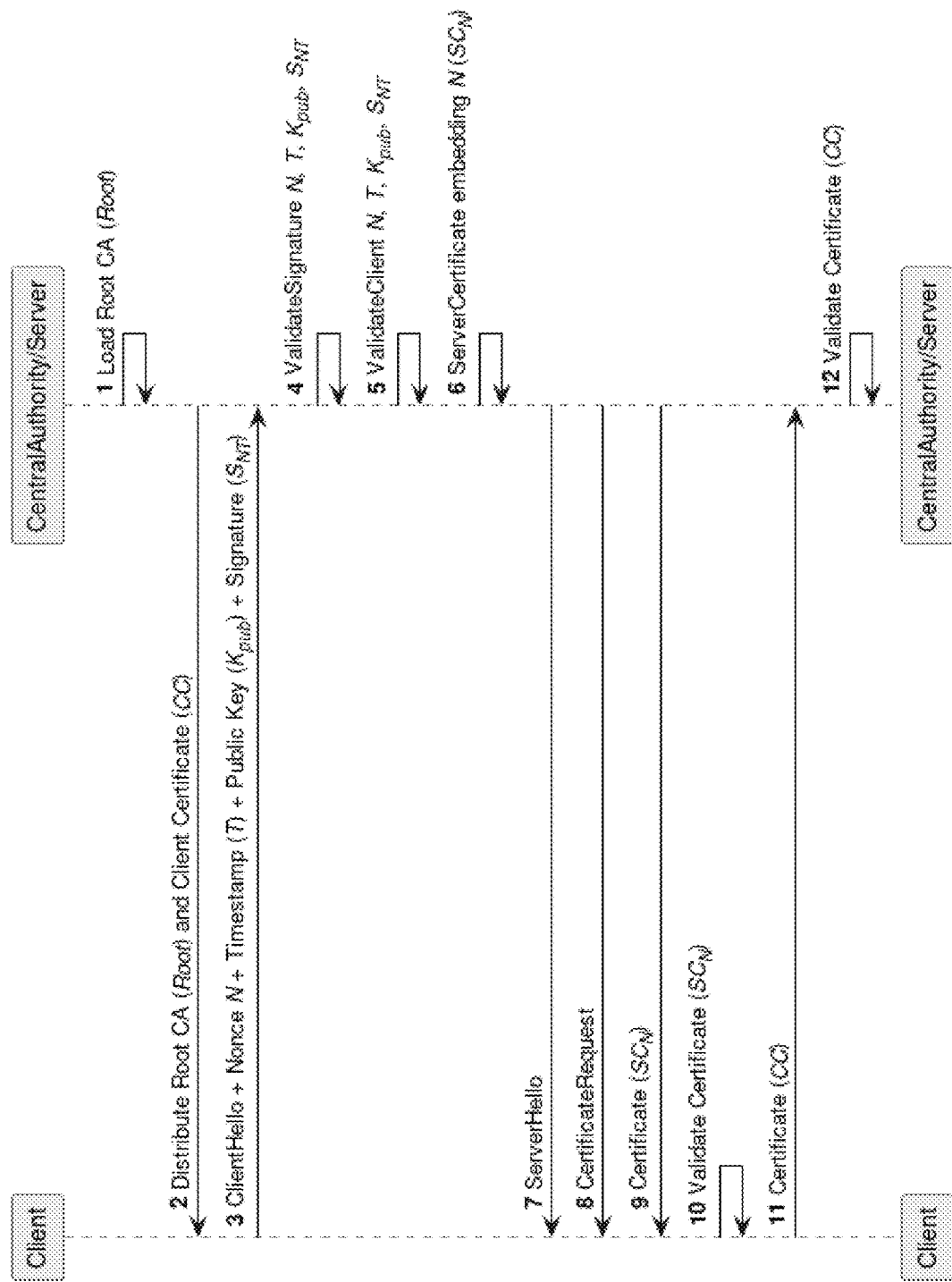
Figure 7:
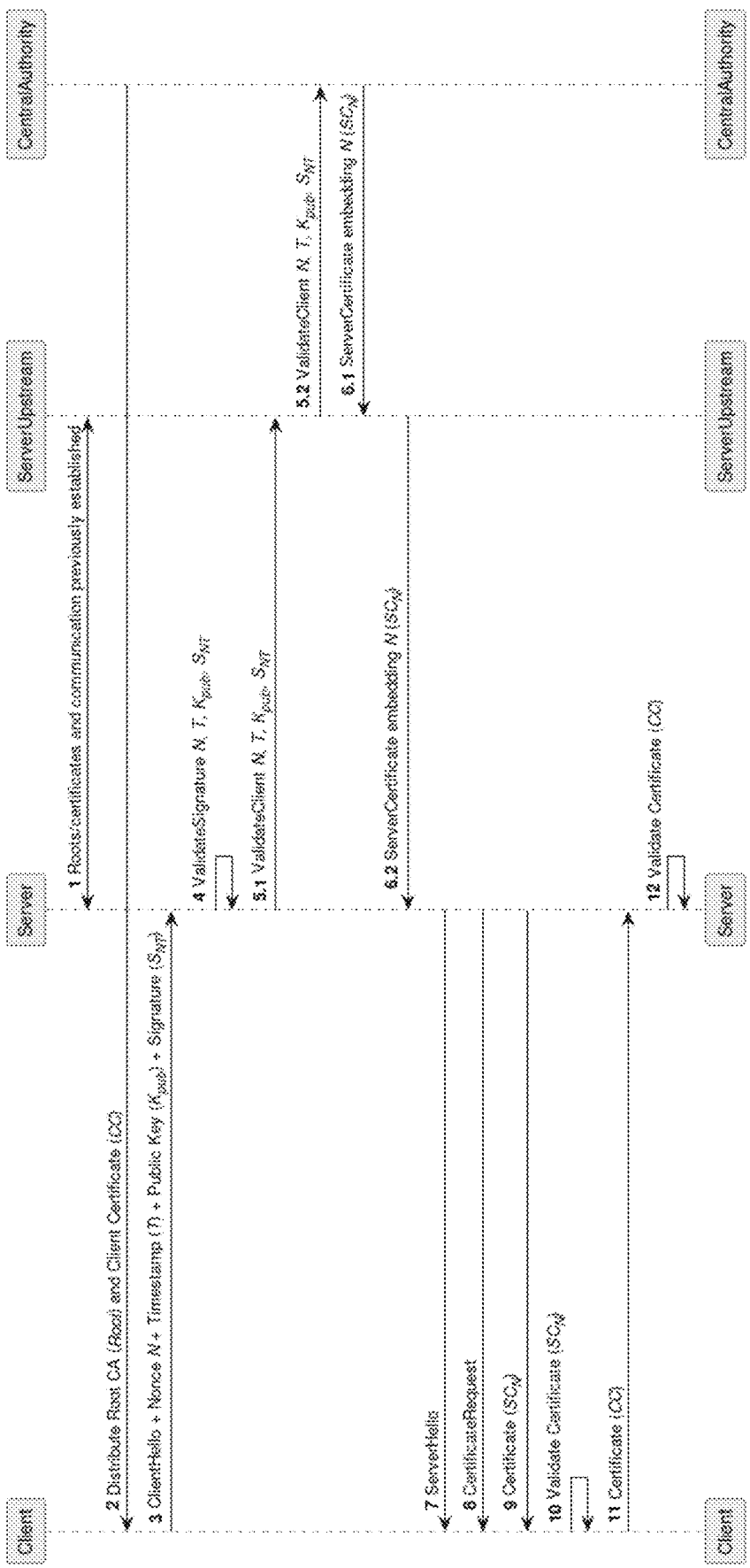

As discussed previously, one of the main uses for this invention is creating multi-hop networks where not all nodes are able to have a direct connection to a central authority. This is enabled by using the previously discussed connection establishment scheme for any given set of upstream/downstream nodes and allowing an upstream node to proxy its messages to the central authority across its own upstream node(s). FIGS. 6 and 7 show two variations on the mechanism described above with respect to FIG. 5.

Initial Hop

FIG. 6 shows an initial hop using the same mechanism but illustrating how it can be applied where the central authority acts as the upstream node for the initial downstream node(s) in the network. This is akin to traditional network connection establishment, and shows the applicability of this new mechanism extends not just to multi-hop networks but can be a common establishment mechanism serving single—or multi-hop network configurations. This provides value as it means networks do not need to be reconfigured to take advantage of the invention, but rather that the invention can enable common workflows regardless of network topology.

Multi-Hop

FIG. 7 illustrates a multi-hop implementation of the mechanism when an additional upstream node is added between the server and central authority, allowing the messages of the mechanism to be passed through unchanged from one node through one or more of its upstream nodes.

For brevity, assume that the mechanism as described and illustrated in FIG. 6 was carried out between the server (as the downstream in that connection establishment) and its upstream, allowing them to have previously established trusted communications.

This can be carried across any number of nodes between a given client (downstream) node and server (upstream) node, without either needing direct access to the central authority, so long as a path of trusted nodes has been established that allows for a message to be proxied to and from the central authority from any given upstream node, providing a significant advantage over state-of-the-art mechanisms that require access to the central authority from all nodes. The mechanism described herein circumvents that need by providing a new way to establish that path of trusted nodes.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for establishing verified and trusted communications between an upstream node and a downstream node in a network, the method comprising:
   granting, by a central authority, a credential to each of the upstream node and the downstream node, the credential being configured to allow the upstream node and the downstream node to cryptographically sign messages;
   passing, by the downstream node to the upstream node, a cryptographically signed message containing a nonce;
   contacting, by the upstream node, the central authority using the nonce;
   validating, by the central authority, the nonce from the downstream node using a validation mechanism configured for validating the signature on the nonce based on the credential and signature type;
   if validated, issuing, by the central authority, a new cryptographically signed message for the upstream node to present to the downstream node, the new cryptographically signed message containing the nonce associated with the downstream node; and
   verifying, by the upstream node and the downstream node, that the credentials of both nodes are valid according to the central authority.

2. The method in accordance with claim 1, wherein the upstream node is a server machine and the downstream node is a client in a network segment.

3. The method in accordance with claim 1, wherein verifying that the credentials of both nodes are valid and granted by the central authority is performed by the upstream node and the downstream node.

4. The method in accordance with claim 2, wherein the central authority is part of the server.

5. The method in accordance with claim 1, wherein contacting, by the upstream node, the central authority with the downstream node's nonce is performed via multiple upstream nodes in a multi-hop fashion.

6. The method in accordance with claim 1, wherein the credential on the downstream node is a signed client certificate issued by the central authority representing a public key known to the central authority, and the message issued to the upstream node after validation containing the downstream node's nonce is a server certificate issued and signed by the central authority, allowing mutual verification of these certificates.

7. The method in accordance with claim 1, wherein granting the credential by the central authority is performed in advance of establishing communications between the upstream node and the downstream node, and wherein the credentials can be reused.

8. A computer program product comprising a non-transitory machine-readable medium storing instructions that, when executed by at least one programmable processor, cause the at least one programmable processor to perform operations to establish verified and trusted communications between an upstream node and a downstream node in a network, the operations comprising:
   grant, by a central authority, a credential to each of the upstream node and the downstream node, the credential being configured to allow the upstream node and the downstream node to cryptographically sign messages;
   pass, by the downstream node to the upstream node, a cryptographically signed message containing a nonce;
   contact, by the upstream node, the central authority using the nonce;
   validate, by the central authority, the nonce from the downstream node using a validation mechanism configured for validating the signature on the nonce based on the credential and signature type;
   if validated, issue, by the central authority, a new cryptographically signed message for the upstream node to present to the downstream node, the new cryptographically signed message containing the nonce associated with the downstream node; and
   verify, by the upstream node and the downstream node, that the credentials of both nodes are valid according to the central authority.

9. The computer program product in accordance with claim 8, wherein the upstream node is a server machine and the downstream node is a client in a network segment.

10. The computer program product in accordance with claim 8, wherein verifying that the credentials of both nodes are valid and granted by the central authority is performed by the upstream node and the downstream node.

11. The computer program product in accordance with claim 9, wherein the central authority is part of the server.

12. The computer program product in accordance with claim 8, wherein contacting, by the upstream node, the central authority with the downstream node's nonce is performed via multiple upstream nodes in a multi-hop fashion.

13. The computer program product in accordance with claim 8, wherein the credential on the downstream node is a signed client certificate issued by the central authority representing a public key known to the central authority, and the message issued to the upstream node after validation containing the downstream node's nonce is a server certificate issued and signed by the central authority, allowing mutual verification of these certificates.

14. The computer program product in accordance with claim 8, wherein granting the credential by the central authority is performed in advance of establishing communications between the upstream node and the downstream node, and wherein the credentials can be reused.

15. A central authority system for establishing verified and trusted communications between an upstream node and a downstream node in a network, the central authority system comprising:
 a programmable processor, and
 a non-transitory machine-readable medium storing instructions that, when executed by the processor, cause the at least one programmable processor to perform operations comprising:
  grant a credential to each of the upstream node and the downstream node, the credential being configured to allow the upstream node and the downstream node to cryptographically sign messages;
  pass, by the downstream node to the upstream node, a cryptographically signed message containing a nonce;
  contact, by the upstream node, the central authority system using the nonce;
  validate, by the central authority system, the nonce from the downstream node using a validation mechanism configured for validating the signature on the nonce based on the credential and signature type;
  if validated, issue, by the central authority system, a new cryptographically signed message for the upstream node to present to the downstream node, the new cryptographically signed message containing the nonce associated with the downstream node; and
  verify, by the upstream node and the downstream node, that the credentials of both nodes are valid according to the central authority system.

16. The central authority system in accordance with claim 15, wherein the upstream node is a server machine and the downstream node is a client in a network segment.

17. The central authority system in accordance with claim 15, wherein verifying that the credentials of both nodes are valid and granted by the central authority is performed by the upstream node and the downstream node.

18. The central authority system in accordance with claim 16, wherein the central authority is part of the server.

19. The central authority system in accordance with claim 15, wherein contacting, by the upstream node, the central authority with the downstream node's nonce is performed via multiple upstream nodes in a multi-hop fashion.

20. The central authority system in accordance with claim 15, wherein the credential on the downstream node is a signed client certificate issued by the central authority representing a public key known to the central authority, and the message issued to the upstream node after validation containing the downstream node's nonce is a server certificate issued and signed by the central authority, allowing mutual verification of these certificates.

21. The central authority system in accordance with claim 15, wherein granting the credential is performed in advance of establishing communications between the upstream node and the downstream node, and wherein the credentials can be reused.

* * * * *